United States Patent
Affaticati et al.

(10) Patent No.: US 7,284,654 B2
(45) Date of Patent: Oct. 23, 2007

(54) SORTING CONVEYOR PROVIDED WITH TILTING BOWLS

(75) Inventors: Artemio G. Affaticati, Busto Arsizio (IT); Paolo Mignano, Bellinzago Novarese (IT)

(73) Assignee: Dematic S.R.L., Agrate Brianza (Milan) (IT)

( * ) Notice: Subject to any disclaimer, the term of this patent is extended or adjusted under 35 U.S.C. 154(b) by 0 days.

(21) Appl. No.: 10/547,888

(22) PCT Filed: Jan. 28, 2004

(86) PCT No.: PCT/EP2004/000755

§ 371 (c)(1), (2), (4) Date: Jun. 13, 2006

(87) PCT Pub. No.: WO2004/078624

PCT Pub. Date: Sep. 16, 2004

(65) Prior Publication Data

US 2006/0260908 A1    Nov. 23, 2006

(30) Foreign Application Priority Data

Mar. 3, 2003  (EP) .................................. 03004663

(51) Int. Cl.
*B65G 47/46* (2006.01)
(52) U.S. Cl. ................................. 198/370.04
(58) Field of Classification Search ........... 198/370.01, 198/370.03, 370.04

See application file for complete search history.

(56) References Cited

U.S. PATENT DOCUMENTS

| | | | |
|---|---|---|---|
| 4,722,430 A | 2/1988 | Canziani | |
| 5,285,884 A * | 2/1994 | Polling et al. | 198/370.04 |
| 5,662,206 A * | 9/1997 | Baum et al. | 198/370.04 |
| 5,664,660 A | 9/1997 | Prydtz et al. | |
| 5,730,273 A * | 3/1998 | Boller | 198/370.04 |
| 6,712,194 B1 * | 3/2004 | Abildgaard et al. | 198/370.04 |

FOREIGN PATENT DOCUMENTS

| | | | |
|---|---|---|---|
| DE | 35 03 712 A | 8/1985 | |
| DE | 40 90 308 T1 | 9/1990 | |
| FR | 2 528 403 A | 12/1983 | |
| GB | 2 124 573 A | 6/1983 | |
| GB | 2197633 * | 5/1988 | 198/370.04 |
| WO | WO 02 24 557 A1 | 3/2002 | |

OTHER PUBLICATIONS

European Search Report completed Jul. 16, 2003, from corresponding European Application No. EP 03 00 4663.

\* cited by examiner

*Primary Examiner*—James R. Bidwell
(74) *Attorney, Agent, or Firm*—Van Dyke, Gardner, Linn & Burkhart, LLP

(57) ABSTRACT

The invention relates to a sorting conveyor provided with tilting bowls consisting of trucks coupled to each other and transporting carrying bowls which are tilted to an unloading position by a rotary drive arranged on the truck. The rotary drive is connected by a free lower end to a swinging lever which extends downwards and rotates around a pivot axis on the truck. The lever carries the bowl by an opposite top end thereof. The rotary drive is fixed to the free lower end of the swinging lever and is provided with an electric motor.

26 Claims, 2 Drawing Sheets

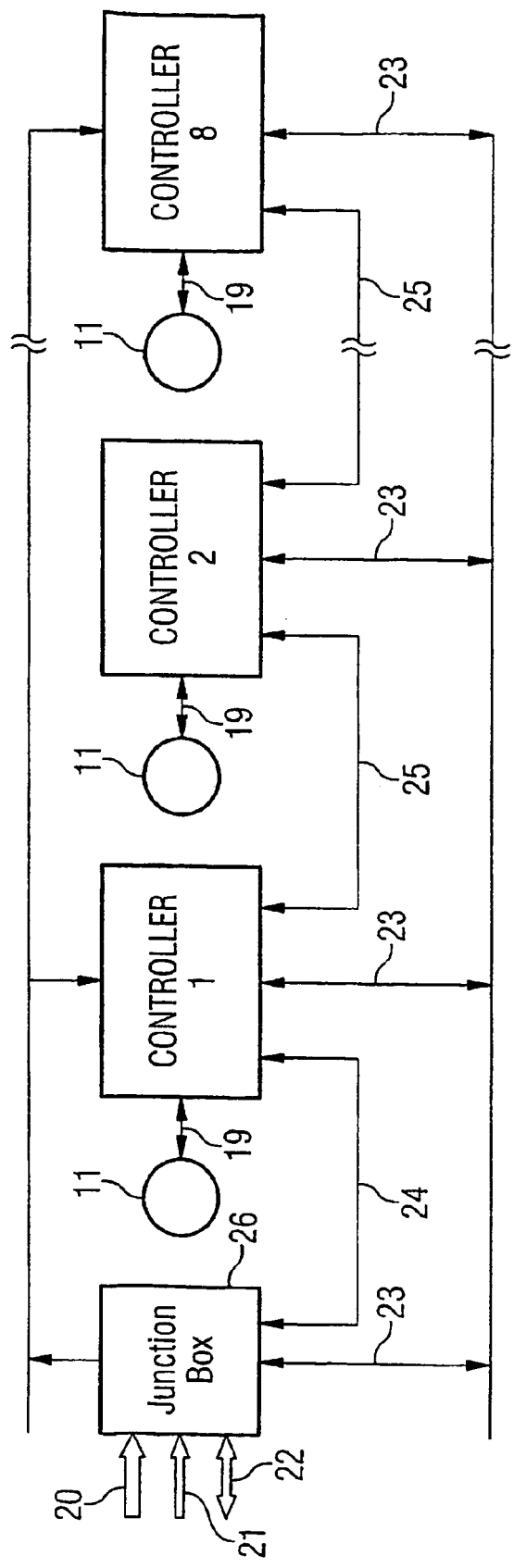

SORTING CONVEYOR PROVIDED WITH TILTING BOWLS

BACKGROUND OF THE INVENTION

The invention relates to a sorting conveyor provided with tilting bowls, in particular for packages, parcels, containers and baggage, comprising cars, which are coupled to one another to form a train and can be moved along by running rails, each having at least one carrier bowl which is arranged thereon and can be pivoted from a horizontal transport position, about a tilting axis extending in the direction of travel, on both sides to an unloading position for the purpose of delivering conveyed goods transported whilst resting on the carrier bowl by means of a tilting drive arranged on the car, the tilting drive, which controls the pivoting movement of the carrier bowl, acting on the free, lower end of a tilting lever which extends downwards, can be pivoted about the tilting axis mounted on the car and bears the carrier bowl centrally at its opposite, upper end.

So-called tilting-bowl sorters have long been proven to be useful for transporting and isolating parcels. The conveyed goods are in this case received by track-guided vehicles which have charge carriers in the form of carrier bowls on their upper side which are held horizontally for the purpose of transporting the load and can be tilted for the purpose of delivering the load.

DE 40 90 308 T1 has disclosed such a conveyor provided with tilting bowls, in the case of which tilting of the carrier bowls is made possible by the fact that a selected cam follower roller connected to the tiltable carrier bowl is initially pulled outwards and then downwards. When pulling outwards, rollers move, guided by a corresponding pivoting movement of an arm, outwards in guide sections such that, when they are guided along the sections, they make it possible for the arm to move downwards, by means of which the tilting body and its carrier bowl are tilted. During tilting, other rollers move upwards, guided by tracks. In this case, the arm remains in a largely unchanged angular position, which ensures that the rollers return to the initial position with the subsequent return tilting. Although the rollers slide in corresponding curved guides on a perpendicular plane to the direction of travel, there is a high resistance for the rollers to be pulled outwards. The action of the analogous roller on the opposite arm being pulled inwards counteracts the action of this roller being pulled outwards. The frictional resistance is therefore correspondingly high, and rollers and arms are subjected to correspondingly high loads. This known solution can therefore be used, if required, for smaller items of conveyed goods, whose weight does not exceed a few kilograms.

Furthermore, the French laid-open specification FR 2528403 A1 has disclosed a sorting conveyor having individual drivable cars, on which carrier bowls are arranged which can be pivoted about a tilting axis extending in the direction of travel. The carrier bowls have, on their undersides, tilting levers which are spaced apart from one another in the direction of travel, extend downwards and are mounted in their central region on the tilting axes on the car. Acting on the free tilting lever end is a tilting mechanism which is essentially formed by a twin lever which is mounted on the car such that it can pivot about a first axis extending parallel to the tilting axis and a second axis extending transversely with respect to the direction of travel. The first end of the twin lever is connected in an articulated manner to the free tilting lever end, and the second end bears rollers which can be rotated about substantially horizontally extending axes. The rollers are lifted for the tilting operation of the carrier bowl by stationary curved rails, which are arranged along the running rails and whose extent rises in the vertical direction, with the result that the twin lever is first pivoted about the second axis for unlatching the carrier bowl and then about the first axis for the purpose of tilting the carrier bowl.

The known tilting-bowl conveyors are very complicated since complex mechanical rollers, levers and linkages are required for the purpose of introducing the tilting movement of the carrier bowls, and these rollers, levers and linkages interact with equally complex rails, rollers and guides on the travel path of the conveyor in the tilting region of the carrier bowls. The tilting angle of the carrier bowls is fixed by the geometry of these mechanical components such that it cannot be changed, and the tilting time and the tilting method are fixed by the design of the mechanical guides alongside the travel path of the conveyor.

SUMMARY OF THE INVENTION

One object of the present invention is to design a known tilting-bowl conveyor such that it is possible for the tilting movement of the carrier bowls to be introduced in a flexible manner whilst maintaining a simplified and thus cost-effective design, and such that the tilting angle and thus the inclination of the carrier bowls can be adjusted with variable control.

In order to achieve the object, the invention proposes that the tilting drive be fixed to the free, lower end of the tilting lever and comprise an electric motor, whose direction of rotation can be altered, and at least one pinion, which can be driven by said electric motor, having an axis of rotation which is parallel to the tilting axis, said pinion corresponding to an arched, toothed rod which is fixed to the car transversely with respect to the direction of travel, extends equidistantly with respect to the tilting axis of the carrier bowls and whose radian measure at least corresponds to the maximum pendulum angle of the tilting lever which is required for tilting the carrier bowl into the unloading positions.

A particular feature of the solution according to the invention is the arrangement of the tilting drive, in the form of an electric motor which is fixed to the tilting lever and interacts with one or two toothed rods fixed to the frame of the car, which is concomitantly conveyed on the car. Owing to this arrangement, the tilting drive is independent of any guide rails, curved sections and control rollers on the travel path of the conveyor as well as further mechanical linkages and levers, as are known in the various embodiments from the prior art. According to the invention, the carrier bowl is tilted in a simple manner by the electric motor which is supported on the toothed rod(s) being driven, as a result of which the tilting lever with the carrier bowl fixed thereon can be brought into the tilted position. The toothed rods are arranged in the form of arcs so as to correspond to the path on which the tilting lever with the electric motor pivots about the tilting axis, the length of each toothed rod being matched to the maximum required pendulum angle of the tilting lever.

In one simple embodiment of the invention, each pinion is arranged directly on the output shaft of the electric motor. The electric motor may be a simple, inexpensive motor which has a small physical size since, as a result of the lever action of the tilting lever and with an appropriate weight distribution between the carrier bowl and the electric motor, only a low torque needs to be applied in order to pivot even the carrier bowl loaded with heavy conveyed goods.

In an advantageous manner, two tilting levers act on each carrier bowl, the electric motor being fixed between the lower, free ends of said tilting levers, said electric motor bearing, at each of the two ends of its motor shaft, a toothed wheel which corresponds to in each case one of two arched, toothed rods fixed to the car.

According to the invention, the electric motor can be driven by a controller arranged in the upper region of the tilting lever close to the carrier bowl, the electric motor receiving the required signals from said controller, such as "rotating to the right" or "rotating to the left"; further mechanical devices can be dispensed with. The controller is preferably accommodated in a housing arranged beneath the carrier bowl.

In order that no unintentional pivoting of the carrier bowl can take place when loading or during transportation travel of the conveyor, in particular on straight stretches of track, according to a further feature of the invention, a latching mechanism is provided between the tilting lever and the car, by means of which latching mechanism the carrier bowl can be locked in the horizontal transport position.

The latching mechanism preferably comprises a locking bolt which is arranged on the tilting lever and can be electromagnetically latched to the car. The locking bolt can be extended or withdrawn, for example, by means of a magnet armature and moved into a cutout or between stops which are arranged fixedly on the car.

In order to prevent tilting of the carrier bowl beyond a certain fixed amount, in accordance with another feature of the invention, the pendulum angle of the tilting lever is controlled electronically and is delimited by end stops provided on both sides of the pendulum path on the car. These end stops may be passive, for example in the form of rubber cams, or else in the form of end switches, by means of which the electric motor is switched to stop when the end position has been reached.

As an additional support for the tilting drive and for the purpose of assisting in resetting the carrier bowl to its initial position, another feature of the invention provides for the horizontal transport position of the carrier bowl to be capable of being set by spring force acting on the tilting lever.

Such a spring may be in the form of, for example, a leaf spring which is clamped at one end, extends parallel to the tilting lever longitudinal axis in the relieved position and stores the resetting spring force between stops on the car as soon as the tilting lever is deflected out of the rest position, i.e., when the electric motor is actuated, the tilting lever with the carrier bowl pivots into the tilted position provided, at the same time the spring being pushed against a stop and being stressed in the process. As soon as the drive force of the electric motor has been switched off, the spring acts in the opposite direction and brings about resetting of or assists in resetting the tilting lever to the transport position of the carrier bowl.

In order to supply the electric motor and the associated controller with energy, in accordance with a further feature of the invention, contact collector lines are provided on the travel path of the car for the purpose of feeding in the electrical drive current and/or control current. This type of energy supply and control is known per se and does not need to be explained in any more detail here.

One particular embodiment of the invention proposes that the carrier bowl can be pivoted in a targeted manner from the horizontal to any desired position between the horizontal transport position and the unloading position with the aid of the tilting drive and its controller and can be fixed temporarily in this position. This "variable" tilting of the carrier bowl makes it possible, for example, for the carrier bowl to be inclined on curved stretches through any desired angle in order to counteract the centrifugal force acting on the conveyed goods. The inclination can be matched to the curve or to the centrifugal force resulting from the speed of the vehicle, and it is possible for resetting to the horizontal once the curve has been traversed to be controlled without any problems by the control system of the sorting conveyor provided with tilting bowls.

According to the invention, the duration, the speed and the acceleration of the tilting operation of the carrier bowl can advantageously be controlled, and the tilting operation of the carrier bowl can likewise be controlled as a function of the size, the position and the weight of the conveyed goods lying on the carrier bowl. In this manner, it is possible for the unloading operations to be matched individually to the conveyed goods and the unloading locations.

When arranging two carrier bowls on one car, it is possible, in accordance with another feature of the invention, for the tilting movement of the two carrier bowls to be controlled independently or to be controlled simultaneously.

According to the invention, a control system for a train of the sorting conveyor provided with tilting bowls comprises a power supply line for the system, communications lines between a junction box connected to an upstream computer and the controllers arranged on the individual cars, in each case a communications line between the controllers of adjacent cars of a train for self-addressing of these cars and a power supply line between in each case the controller of a car and the associated electric motor and locking bolt.

A method for controlling the sorting conveyor provided with tilting bowls of the type described above is characterized in that the junction box, after communicating with an upstream computer in which the information required for operating the transport system is stored, provides a controller, which is arranged on each car coupled to one another to form a train and is determined as the master, with an address, and this controller passes on the address for self-addressing purposes to a further car of the train, this car, after self-configuration, for its part passing on the address for self-configuration purposes to the next car until all cars of the train have been configured. A master controller is allocated to a train comprising, for example, 8 or 32 cars, and an address is allocated to the master controller by the junction box. This address is automatically passed on by the master controller to the control system of the following car when the train is started. This following car correspondingly undergoes self-configuration, the process being repeated, i.e. the address being passed on from car to car, until all of the cars have been addressed. This has the advantage that only a physical replacement of the defective part needs to take place in the event of a defective control system since the novel control system is self-configuring.

A further feature of the invention proposes that the activation commands for the electric motor for the purpose of altering the angular position of the tilting lever are fed to the controllers arranged on the individual cars via the communications lines between the junction box connected to the upstream computer and said controllers. Each controller can activate the electric motor with different predeterminable profiles such that the unloading method can be made suitable both for the material to be conveyed and the geometry of the unloading locations.

According to the invention, information relating to system diagnostics and statistics can also be exchanged via the communications lines provided.

The electric motor and the locking bolt on the tilting lever are preferably linked to one another such that the locking bolt is electromagnetically unlatched prior to activation of the electric motor. This ensures that no unintentional tilting of the carrier bowl takes place in the event of a fault.

The tilting-bowl conveyor according to the invention has a very simple design but is also extremely flexible in use. The electric motor, which is concomitantly conveyed on each car, acts directly on the tilting lever bearing the carrier bowl and is controlled by an upstream computer and controllers located on board, cannot only initiate unloading of the carrier bowls at any desired point on the travel path of the conveyor without any mechanical changes being made to the system, but primarily can also change the tilting angle, the tilting speed or acceleration and the curve inclination of the conveyor. The control can be programmed in a simple manner such that, overall, a transport system is created which is considerably simplified and improved compared with the known prior art.

The invention will be explained with reference to the exemplary embodiment illustrated in the drawings.

BRIEF DESCRIPTION OF THE DRAWINGS

FIG. 2 is a schematic illustration of the circuit diagram of the control system of the present invention.

DETAILED DESCRIPTION OF THE PREFERRED EMBODIMENT

Figure 1:
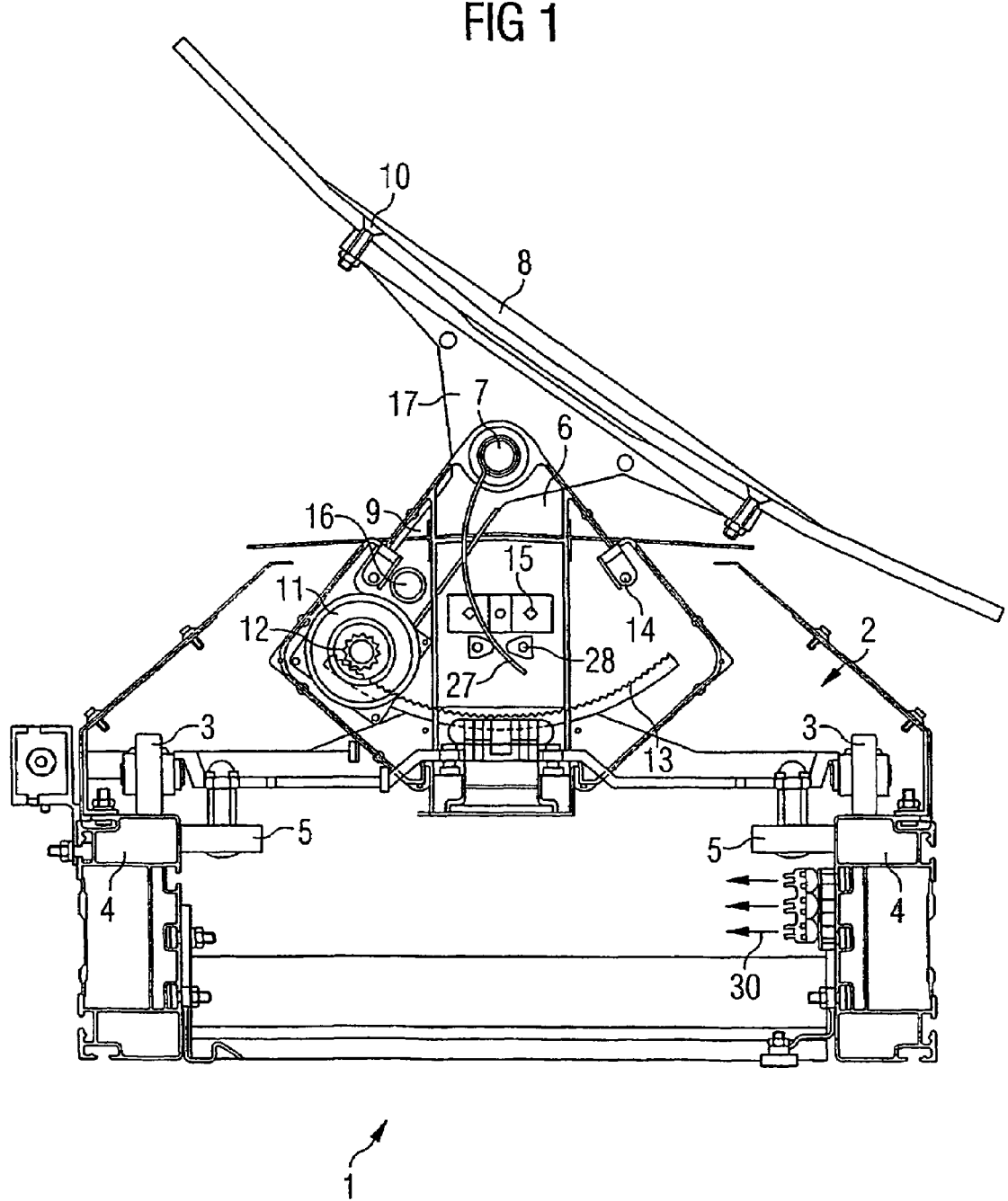
FIG. 1 is a cross sectional view through a car of the tilting-bowl conveyor of the present invention.

In FIG. 1, a cross section through a tilting-bowl conveyor according to the invention is given the reference 1. The car (given the reference 2) is guided with its horizontal wheels 3 on the running rails 4 of the conveyor system; vertical guide wheels 5 hold the car 2 on the track. The horizontal tilting axis 7 for the two tilting levers 9, to which the carrier bowl 8 is fixed at 10, is provided on a frame part 6 of the car 2 which extends upwards. In the drawing, only the front of the two tilting levers which lie one behind the other can be seen. The upper side of the tilting lever 9 is widened in order to be able to fix the carrier bowl 8 better to its underside. The tilting levers 9 extend on the other side of the tilting axis 7 downwards, the electric motor 11 being fixed to the lower end between the tilting levers 9. The electric motor 11 bears, on both of its ends of the output shaft, in each case one pinion or one toothed wheel 12 which meshes in each case with one of the arched, toothed rods 13, which are fixed at a parallel distance from one another on the frame part 6 of the car 2 transversely with respect to the direction of travel of the car 2. When the electric motor 11 is actuated, the pinions 12 mesh with the toothed rods 13 and move the tilting levers 9 and thus the carrier bowl 8 to the right or to the left about the tilting axis 7, depending on the reversible rotation direction of the electric motor 11. The end positions of the tilting levers are delimited by end stops or end switches 14.

Provided on the frame part 6, in which the tilting axis 7 is mounted, is a latching mechanism 15 for at least one of the tilting levers 9, into which latching mechanism 15 a locking bolt 16 can be latched if the tilting lever and thus the carrier bowl are located in a position in which the carrier bowl is aligned horizontally. The movement of the tilting levers and the driving of the electric motor take place by means of a controller which is installed in a housing (not illustrated) in the upper region 17 of the tilting levers 9 beneath the carrier bowl 8. The controller is driven (in a manner which is likewise not illustrated) via a bus or contact collector lines 30 which are laid on the frame of the running rails 4 or beneath the car 2.

27 denotes a leaf spring which extends parallel to the longitudinal axis of the tilting levers 9 in the relieved position and is fixed on one of the tilting levers 9 in the region of the tilting axis 7. When the tilting levers 9 are deflected from the vertical, the leaf spring 27 is pushed against the right-hand or left-hand stop 28 on the frame part 6 of the car 2 and bent, a force being stored in the leaf spring 27 which attempts to reset the tilting levers 9. This spring resets the carrier bowl 8 into the neutral position even in the event of failure of a drive part.

The electrical drive current and/or control current is fed in via contact collector lines 30 on the travel path of the car 2 in a manner known per se. The invention also makes it possible for the carrier bowl 8 to be pivoted in a targeted manner from the horizontal to any desired position between the horizontal transport position and the unloading position with the aid of the tilting drive and its controller and to be temporarily fixed in this position. As a result, the unloading point, the tilting angle and also the transport position of the carrier bowl 8 can be altered in a very flexible manner, it being possible for oblique positions of the carrier bowl 8 to be realized in a very simple manner counter to the centrifugal force acting when the cars 2 traverse curves.

FIG. 2 is a schematic illustration of the circuit diagram of the control of the tilting-bowl conveyor. The power supply line for the system is given the reference 18 and it supplies the controllers 1 to 8 of a train comprising, overall, eight cars, of which only three controllers 1, 2, 8 are illustrated symbolically, however. Each controller is connected to the respective electric motor M via a communications line 19 such that the drive can be activated individually.

The left-hand side of the drawing illustrates a junction box 26 which is connected to a 65 volt DC source 20. The junction box 26 is connected to the main port 22 of an upstream computer, preferably a PC, via the data connection 21. From the junction box 26, a series communications line 23 leads to each controller 1 to 8; communication takes place via this line in both directions such that, for example, statistical data can also be retrieved. Furthermore, the junction box 26 is connected, via the line 24, to the adjacent first controller 1 which in turn is connected, via the line 25, to the adjacent controller 2; all of the successive controllers 1 to 8 are linked to one another in the same way. This linking is used for self-addressing purposes since a "master carrier" is fixed in each of the trains comprising, for example, 8 cars, the PC distributing an address to said "master carrier" via the junction box. On starting, the master carrier automatically passes on the address to the controller of the following car, with the result that said controller is correspondingly self-configured. This process is repeated via the data lines 24 and 25 until all of the cars have been configured with the corresponding address. Should one of the controllers need to be replaced owing to a defect, only a physical replacement is necessary with this configuration since the changed control system is self-configuring.

The control system illustrated carries out the following main commands:

a controlled pendulum movement of the tilting levers, starting from the central point, at which the tilting levers are substantially perpendicular (horizontal carrier bowl), towards the right-hand side, b controlled tilting lever movement from the central point to the left-hand side, c resetting of the tilting levers extending downwards from one of the two sides to the central point, and d controlled tilting lever movement from the right-hand side to the left-hand side, and vice versa.

Care should be taken with the main commands a and b that the tilting levers are initially locked in the central position by the locking bolt. In order to carry out commands 1, 2 and 4, the controller must first remove the locking bolt. This takes place by feeding an activating electromagnetic relay, and when said relay is driven at the same time a drive position test is carried out by the controller so that the tilting levers remain in their position. As soon as the locking bolt has been completely released from its latch, the controller activates the drive of the electric motor in order to pivot the tilting levers.

Pivoting of the tilting levers to the side can be described in three movements:

a the tilting levers move until they have reached the outermost left-hand or outermost right-hand side, b the tilting levers move until they have reached a central position with respect to the right-hand or left-hand side, and c the tilting levers move to one of the two sides and then move into any desired central position between the outermost left-hand side and the outermost right-hand side.

While the movements described under a) and b) correspond to unloading of the carrier bowl to the right-hand or left-hand side, the movement described under c) is used for moving the conveyed goods on the carrier bowl or for compensating for the centrifugal force acting on the conveyed goods when curved sections are traversed.

The invention claimed is:

1. A sorting conveyor for goods such as packages, parcels, containers and baggage, said sorting conveyor comprising:
   a plurality of cars coupled to one another to form a train, said cars being moveable along running rails, each said car comprising;
   at least one carrier bowl arranged said car, said carrier bowl being pivotable from a horizontal transport position about both sides of a tilting axis extending in the direction of travel to an unloading position for delivering conveyed goods transported on the carrier bowl; and
   a tilting drive adapted to control the pivoting movement of said carrier bowl, said tilting drive acting on the free, lower end of at least one tilting lever, said tilting lever extending downwards and being pivotable about said tilting axis mounted on said car, said tilting lever bearing the carrier bowl centrally at an opposite, upper end of said tilting lever;
   said tilting drive being fixed to the free, lower end of said tilting lever and comprising an electric motor having an alterable direction of rotation, and at least one pinion adapted to be driven by said electric motor and having an axis of rotation which is parallel to said tilting axis, said pinion corresponding to an arched, toothed rod, said toothed rod being fixed to said car transversely with respect to the direction of travel and extending equidistantly with respect to the tilting axis of said carrier bowls, said toothed rod having a radian measure that at least corresponds to the maximum pendulum angle of said tilting lever required for tilting said carrier bowl into the unloading positions.

2. The sorting conveyor of claim 1, wherein each said pinion is arranged directly on an output shaft of said electric motor.

3. The sorting conveyor of claim 2, wherein two said tilting levers act on each said carrier bowl, said electric motor being fixed between the lower, free ends of said tilting levers, and wherein said electric motor includes, at each of two ends of said motor shaft, a toothed wheel, and wherein each said toothed wheel corresponds to one of two arched, toothed rods fixed to said car.

4. The sorting conveyor of claim 1, wherein said electric motor is adapted to be driven by a controller, said controller being arranged in the upper region of said tilting lever close to said carrier bowl.

5. The sorting conveyor of claim 1, wherein a latching mechanism is provided between at least one of said tilting levers and said car, said latching mechanism being adapted to enable said carrier bowl to be locked in the horizontal transport position.

6. The sorting conveyor of claim 5, wherein said latching mechanism comprises a locking bolt arranged on at least one of said tilting levers, said locking bolt adapted to being electromagnetically latched to said car.

7. The sorting conveyor of claim 6, wherein the pendulum angle of at least one of said tilting levers can be controlled electronically and can be delimited by end stops provided on both sides of the pendulum path on said car.

8. The sorting conveyor of claim 7, wherein said end stops interact mechanically with said locking bolt arranged on said tilting lever.

9. The sorting conveyor of claim 8, wherein the horizontal transport position of said carrier bowl can be set by spring force acting on at least one said tilting lever.

10. The sorting conveyor of claim 9, wherein the spring force is provided by a leaf spring, said leaf spring being clamped at one end and extending parallel to the longitudinal axis of said tilting lever in the relieved position, said leaf spring storing the resetting spring force between stops on said car as soon as said tilting lever is deflected out of the rest position.

11. The sorting conveyor of claim 10, further including contact collector lines on the travel path of said car, said contact collector lines adapted to feed in at least one selected from the group consisting of an electrical drive current and a control current.

12. The sorting conveyor of claim 4, wherein said carrier bowl can be pivoted in a targeted manner from the horizontal to any desired position between the horizontal transport position and the unloading position with the aid of said tilting drive and said controller, and wherein said carrier bowl can be fixed temporarily in this position.

13. The sorting conveyor of claim 4, wherein the duration, the speed and the acceleration of the tilting operation of said carrier bowl can be controlled.

14. The sorting conveyor of claim 4, wherein the tilting operation of said carrier bowl can be controlled as a function of the size, the position and the weight of the conveyed goods lying on said carrier bowl.

15. The sorting conveyor of claim 1, wherein two carrier bowls are arranged on at least one said car, and wherein the tilting movement of said two carrier bowls is adapted to be controlled independently or to be controlled simultaneously.

16. The sorting conveyor of claim 4, further including a control system, said control system comprising:
   a power supply line for said control system;

communications lines between a junction box connected to an upstream computer and said controllers arranged on the individual said cars;

a communications line between said controllers of adjacent said cars of said train for self-addressing of said cars; and a power supply line between said controller of each said car and the associated said electric motor.

17. The sorting conveyor of claim 1, wherein the pendulum angle of at least one of said tilting levers can be controlled electronically and can be delimited by end stops provided on both sides of the pendulum path on said car.

18. The sorting conveyor of claim 1, wherein the horizontal transport position of said carrier bowl can be set by spring force acting on at least one said tilting lever.

19. The sorting conveyor of claim 18, wherein the spring force is provided by a leaf spring, said leaf spring being clamped at one end and extending parallel to the longitudinal axis of said tilting lever in the relieved position, said leaf spring storing the resetting spring force between stops on said car as soon as said tilting lever is deflected out of the rest position.

20. The sorting conveyor of claim 1, further including contact collector lines on the travel path of said car, said contact collector lines adapted to feed in at least one selected from the group consisting of an electrical drive current and a control current.

21. The sorting conveyor of claim 16, wherein each said car of said sorting conveyor further includes a locking bolt arranged on said tilting lever, said locking bolt adapted to being electromagnetically latched to said car to enable said carrier bowl to be locked in the horizontal transport position, and wherein said power supply line between said controller of each said car and the associated said electric motor is also between said locking bolt.

22. A method for controlling a sorting conveyor, said sorting conveyor comprising:

a plurality of cars coupled to one another to form a train, each said car comprising;

at least one pivotable carrier bowl arranged on said car;

a tilting drive adapted to control the pivoting movement of said carrier bowl, said tilting drive being fixed to a tilting lever and comprising an electric motor and at least one pinion driven by said electric motor;

a controller adapted to drive said electric motor; and a control system comprising a power supply line, communications lines between a junction box connected to an upstream computer and said controllers arranged on the individual said cars, a communications line between said controllers of adjacent said cars of said train for self-addressing of said cars, and a power supply line between said controller of each said car and the associated said electric motor;

said method comprising:

communicating information required for operating the transport system from an upstream computer in which the information is stored to said junction box;

providing a master controller, arranged on a said car coupled to said train with an address from said junction box;

passing on the address for self-addressing purposes to a further said car of said train;

receiving the address by the said controller of the further said car of train;

self-configuring of said controller with the address;

repeating the steps of passing on the address for self-configuration purposes to the next car, receiving the address, and self-configuring until all cars of the train have been configured.

23. The method of claim 22, further comprising providing activation commands for the electric motor for the purpose of altering the position of the tilting lever, wherein the activation commands are fed to said controllers arranged on the individual said cars via said communications lines between said junction box connected to the upstream computer and said controllers.

24. The method of claim 23, further comprising exchanging information relating to system diagnostics and statistics via said communications lines.

25. The method of claim 24, wherein each said car of said sorting conveyor further includes a locking bolt arranged on said tilting lever, said locking bolt adapted to being electromagnetically latched to said car to enable said carrier bowl to be locked in the horizontal transport position, and wherein said power supply line between said controller of each said car and the associated said electric motor is further between said locking bolt, said method further comprising unlatching the locking bolt for the tilting lever electromagnetically prior to activation of said electric motor.

26. The method of claim 22, wherein each said car of said sorting conveyor further includes a locking bolt arranged on said tilting lever, said locking bolt adapted to being electromagnetically latched to said car to enable said carrier bowl to be locked in the horizontal transport position, and wherein said power supply line between said controller of each said car and the associated said electric motor is further between said locking bolt, said method further comprising unlatching the locking bolt for the tilting lever electromagnetically prior to activation of said electric motor.

* * * * *